United States Patent
Iovu (10) Patent No.: US 12,201,188 B2
(45) Date of Patent: *Jan. 21, 2025

(54) MULTILAYERED MATERIALS WITH COLOR CHANGING PROPERTIES

(71) Applicant: adidas AG, Herzogenaurach (DE)

(72) Inventor: Tiberiu Iovu, Vancouver, WA (US)

(73) Assignee: adidas AG, Herzogenaurach (DE)

(*) Notice: Subject to any disclaimer, the term of this patent is extended or adjusted under 35 U.S.C. 154(b) by 0 days.

This patent is subject to a terminal disclaimer.

(21) Appl. No.: 17/953,643

(22) Filed: Sep. 27, 2022

(65) Prior Publication Data
US 2023/0049710 A1    Feb. 16, 2023

Related U.S. Application Data

(63) Continuation of application No. 16/994,295, filed on Aug. 14, 2020, now Pat. No. 11,484,096, which is a (Continued)

(51) Int. Cl.
*A43B 23/02*  (2006.01)
*A41D 27/00*  (2006.01)
(Continued)

(52) U.S. Cl.
CPC .......... *A43B 23/0265* (2013.01); *A41D 27/00* (2013.01); *A43B 1/0027* (2013.01); *A43B 1/0072* (2013.01); *A43B 3/0036* (2013.01); *A43B 23/027* (2013.01); *A43B 23/0275* (2013.01); *B32B 27/08* (2013.01); *B32B 27/40* (2013.01); *B32B 2250/03* (2013.01); *B32B 2307/404* (2013.01); *B32B 2307/41* (2013.01); *B32B 2307/414* (2013.01); *B32B 2307/51* (2013.01); *B32B 2437/00* (2013.01); *B32B 2437/02* (2013.01)

(58) Field of Classification Search
CPC ............................ A43B 23/0265; A41D 27/00
USPC ............................................................ 36/84
See application file for complete search history.

(56) References Cited

U.S. PATENT DOCUMENTS 6,796,057 B2   9/2004   Davis
7,421,806 B2   9/2008   Braynock et al.
(Continued)

FOREIGN PATENT DOCUMENTS

JP   9078416       3/1997
WO   0232642 A2    4/2002
WO   2013086477 A1 6/2013

OTHER PUBLICATIONS http://www.nanotech-now.com/news.cgi?story_id=31400, "Development of Polymer Films that Change Color in Response to Tension: Easy Visualization of Mechanical Force", Nov. 18, 2008.
http://hellomaterialsblog.ddc.dk/2013/05/13/chromic-phenomena-colour-and-light-manipulation-in-materials-inspiredby-nature/, May 13, 2013.
(Continued)

*Primary Examiner* — Timothy K Trieu
(74) *Attorney, Agent, or Firm* — Kilpatrick Townsend & Stockton LLP (57) ABSTRACT

Described are articles of wear including with a material with color changing properties. The material includes at least one elastic portion having an unstretched colored appearance and a stretched colored appearance. The material also includes at least one fixed portion having the stretched colored appearance regardless of a magnitude of an external force applied to the at least one fixed portion.

14 Claims, 9 Drawing Sheets

Related U.S. Application Data continuation of application No. 15/884,917, filed on Jan. 31, 2018, now Pat. No. 10,779,617, which is a continuation of application No. 14/540,716, filed on Nov. 13, 2014, now Pat. No. 9,901,138.

(51) Int. Cl.
| | |
|---|---|
| *A43B 1/00* | (2006.01) |
| *A43B 3/00* | (2022.01) |
| *B32B 27/08* | (2006.01) |
| *B32B 27/40* | (2006.01) |

(56) References Cited

U.S. PATENT DOCUMENTS

| | | | |
|---|---|---|---|
| 7,704,589 B2 | 4/2010 | Olson et al. | |
| 8,200,323 B2 | 6/2012 | DiBenedetto et al. | |
| 9,185,946 B2 | 11/2015 | Leary et al. | |
| 9,789,644 B2 | 10/2017 | Iovu | |
| 9,901,138 B2* | 2/2018 | Iovu | A43B 23/0275 |
| 10,779,617 B2 | 9/2020 | Iovu | |
| 2003/0207638 A1 | 11/2003 | Bowlin et al. | |
| 2004/0172855 A1* | 9/2004 | Aslanides | A43B 23/24 36/45 |
| 2006/0096129 A1 | 5/2006 | Kaplan et al. | |
| 2006/0148915 A1 | 7/2006 | Floyd et al. | |
| 2006/0151857 A1 | 7/2006 | Gasparoni | |
| 2006/0246802 A1 | 11/2006 | Hughes et al. | |
| 2008/0233418 A1* | 9/2008 | Krueger | B29C 48/08 528/502 B |
| 2009/0012207 A1 | 1/2009 | Leyrer et al. | |
| 2009/0317649 A1 | 12/2009 | Smith | |
| 2011/0016752 A1* | 1/2011 | Koyess | A43B 1/0072 428/196 |
| 2011/0305006 A1* | 12/2011 | Hehenberger | A41D 31/325 2/69 |
| 2012/0015176 A1* | 1/2012 | Riebel | B32B 27/36 428/521 |
| 2013/0251962 A1* | 9/2013 | Reid, Jr. | D04B 21/00 428/221 |
| 2013/0263349 A1 | 10/2013 | Roser | |
| 2016/0135544 A1 | 5/2016 | Iovu | |

OTHER PUBLICATIONS http://pubs.rsc.org/en/content/articlelanding/2011/jm/c0jm03653f#!divAbstract, "Mechanochromic Polymer Blends", Feb. 15, 2011.

http://coub.com/view/16iqmocv, "Opal-Inspired Material Changes When Stretched", Video, (website screenshot submitted).

Service, http://www.plastemart.com/plastic-facts-information.asp?news_id=13667&news=Polymer-films-thatchange-color-in-response-to-tension, National Institute of Advanced Industrial Science and Technology (AIST), Nov. 21, 2008.

http://hellomaterialsblog.com, "Rainbow Winters Design Using 'Polymer Opal' Lycra. Stretch the Fabric for a Dynamic 'Colour Change'. Image: Flora Deborah", May 9, 2013.

U.S. Appl. No. 14/540,716, Non-Final Office Action, Apr. 7, 2017, 17 pages.

U.S. Appl. No. 14/540,716, Notice of Allowance, Oct. 11, 2017, 11 pages.

U.S. Appl. No. 15/884,917, Non-Final Office Action, Oct. 25, 2019, 10 pages.

U.S. Appl. No. 15/884,917, Notice of Allowance, Jun. 5, 2020, 9 pages.

U.S. Appl. No. 16/994,295, Non-Final Office Action, Feb. 14, 2022, 6 pages.

U.S. Appl. No. 16/994,295, Notice of Allowance, Jul. 12, 2022, 8 pages.

Chinese Patent Application No. 201510765205.3, Office Action mailed Nov. 8, 2017, 14 pages (machine English translation provided).

Chinese Application No. 201510765205.3, Office Action mailed Apr. 6, 2017, 14 pages (machine English translation provided).

European Patent Application No. 15194223.2, European Search Report mailed Feb. 11, 2016, 7 pages.

European Patent Application No. 18195727.5, European Search Report mailed Dec. 14, 2018, 6 pages.

Stevenson et al., http://news.sciencemag.org/chemistry/2009/05/plastics-change-color-when-stressed, May 6, 2009.

Xie, http://arstechnica.com/science/2009/05/sensing-the-stretch-and-compression-of-polymers, May 7, 2009.

Extended European Search Report, European Patent Application No. 22190529.2, Nov. 30, 2022, 6 pages.

* cited by examiner

MULTILAYERED MATERIALS WITH COLOR CHANGING PROPERTIES

CROSS REFERENCE TO RELATED APPLICATION

This is a continuation of U.S. patent application Ser. No. 16/994,295 filed Aug. 14, 2020 entitled "Multilayered Materials With Color Changing Properties" (Allowed) (the '295 application'), which is a continuation of U.S. patent application Ser. No. 15/884,917 filed Jan. 31, 2018, entitled "Multilayered Materials With Color Changing Properties", now U.S. Pat. No. 10,779,617 issued Sep. 22, 2020 (the '617 patent'), which is a continuation of U.S. patent application Ser. No. 14/540,716 filed Nov. 13, 2014, now U.S. Pat. No. 9,901,138, issued Feb. 27, 2018, entitled "Multilayered Materials With Color Changing Properties" (the '138 patent). The entire contents of the '295 application and the '617 and '138 patents are incorporated herein by reference.

FIELD OF INVENTION

The present invention relates to articles of wear formed using multilayered materials with color changing properties.

BACKGROUND

The concept of providing materials that change color in a stretched condition is well-known. For example, U.S. Publication No. 2006/0246802 describes the use of color change laminate materials that include at least two layers of extensible materials that indicate a stretched state by exposing the previously covered coloration of a lower layer through a plurality of slit openings in the upper layer that open when the material is stretched. The color change is used to provide a means of signaling extension and/or levels of extension by a distinctive visual cue for medical applications.

Likewise, U.S. Pat. No. 7,704,589 describes an absorbent article having a built-in size indicator, wherein the size indicator is a stretchable panel that changes color when stretched.

U.S. Publication No. 2013/0251962 describes a color change compression fabric having an elastic material with one color in an unstretched condition that changes to a different color when stretched. The covering layer comprises a covering yarn that is wrapped a number of turns about an elastic yarn having a different color than the covering yarn. When the fabric is stretched, the turns of the covering yarn move apart to expose the elastic yarn underneath.

As described above, the color change occurs by allowing the lower layer to become visible through openings in the upper layer. In contrast, the use of an intermediate layer that blocks visibility of the lower layer when the material is stretched and allows the coloration of the lower layer to combine with the coloration of the top layer when the material is unstretched may provide the opposite effect. Furthermore, the prior art describes use of color changing materials to indicate when too much pressure or stretch has been applied, which is not possible should the material become permanently deformed or stretched.

As a result, it may be desirable to form an article of wear from a color changing material that is designed to block the visibility of a lower layer when stretched to achieve a color changing effect in the stretched regions of the material. It may also be desirable to form an article of wear from a color changing material to achieve an aesthetically pleasing look by permanently deforming the color changing material in areas that do not receive enough stretch during normal use to change color. It may also be desirable to form an article of wear from a color changing material to achieve an aesthetically pleasing look by permanently deforming the color changing material in areas where visual cues are not needed to indicate when the color changing material is stretched.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, an article of wear comprises a material with color changing properties comprising a first layer, a third layer positioned below the first layer, and a second layer positioned between the first layer and the third layer, wherein the second layer comprises a substantially translucent appearance in an unstretched condition, and a substantially opaque appearance in a stretched condition, at least one elastic portion of the material comprising an unstretched colored appearance when the second layer is in the unstretched condition and a stretched colored appearance when the second layer is in the stretched condition, wherein the unstretched colored appearance is different from the stretched colored appearance, and at least one fixed portion of the material comprising a permanently stretched condition, wherein the at least one fixed portion comprises the stretched colored appearance regardless of a magnitude of an external force applied to the at least one fixed portion.

In some embodiments, the first layer comprises a first coloration, and the third layer comprises a second coloration that is different from the first coloration, wherein the unstretched colored appearance comprises a combination of the first coloration and the second coloration, and wherein the second coloration is concealed from the stretched colored appearance by the second layer. The first coloration may be complementary to the second coloration. The second layer may be polyurethane or thermoplastic polyurethane film.

In some embodiments, the at least one fixed portion is located on a shoe upper. The at least one elastic portion may be located over a toe region of a shoe upper. In certain embodiments, the at least one elastic portion is an indicator of when a shoe comprising the shoe upper is not properly sized for a wearer's foot. The at least one fixed portion may be located in an area of the shoe upper where an indicator of the magnitude of the external force being applied to the at least one fixed portion in that location is not needed.

According the certain embodiments of the present invention, an article of wear comprises a material with color changing properties comprising at least one elastic portion comprising an unstretched colored appearance and a stretched colored appearance, at least one fixed portion comprising the stretched colored appearance regardless of a magnitude of an external force applied to the at least one fixed portion, wherein the at least one elastic portion is positioned within the article of wear in a location where the at least one elastic portion is an indicator of a magnitude of an external force being applied to the at least one elastic portion in that location, and wherein the at least one fixed portion is positioned within the article of wear in a location where an indicator of the magnitude of the external force being applied to the at least one fixed portion in that location is not needed.

In some embodiments, the unstretched colored appearance is different from the stretched colored appearance. In these embodiments, at least one fixed portion may be located on a shoe upper. According to some embodiments, the at least one elastic portion is located over a toe region of a shoe upper. The at least one elastic portion may be an indicator of when a shoe comprising the shoe upper is not properly sized for a wearer's foot.

According to certain embodiments of the present invention, an article of wear comprises a material with color changing properties comprising a first layer having a first coloration, a third layer having a second coloration and positioned below the first layer, and a second layer positioned between the first layer and the third layer, at least one elastic portion of the material comprising an unstretched colored appearance comprising a combination of the first coloration and the second coloration, and a stretched colored appearance that does not include the second coloration, wherein the at least one elastic portion is positioned within the article of wear in a location where the at least one elastic portion is an indicator of a magnitude of an external force being applied to the at least one elastic portion in that location, and at least one fixed portion comprising the stretched colored appearance regardless of a magnitude of an external force applied to the at least one fixed portion, wherein the at least one fixed portion is positioned within the article of wear in a location where an indicator of the magnitude of the external force being applied to the at least one fixed portion in that location is not needed.

In some embodiments, the first coloration is different from the second coloration. The first coloration may be complementary to the second coloration. In certain embodiments, the second layer is polyurethane or thermoplastic polyurethane film. The at least one fixed portion may be located on a shoe upper. In these embodiments, the at least one elastic portion may be located over a toe region of a shoe upper. The at least one elastic portion may be an indicator of when a shoe comprising the shoe upper is not properly sized for a wearer's foot.

BRIEF DESCRIPTION OF THE DRAWINGS

In the following detailed description, embodiments of the invention are described referring to the following figures.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

According to certain embodiments of the present invention, as illustrated in FIGS. 1-11, apparel, footwear, sports equipment, and accessories ("articles of wear 10") or components thereof are formed from a color changing material 12. In certain embodiments, as shown in FIGS. 2A-2B, the material 12 comprises at least a first layer 14, a second layer 16, and a third layer 18. However, a person of ordinary skill in the relevant art will understand that the material 12 may comprise more or less layers as needed or desired to achieve the desired properties of the material 12.

In certain embodiments, the first layer 14 comprises a stretchable material, which may include but is not limited to polyurethane ("PU") or thermoplastic polyurethane ("TPU") films, paint, dye, rubber, or other suitable materials. The material that comprises the first layer 14 may include a first coloration, which may be any suitable color including but not limited to any color within the ultraviolet, visible, and infrared light spectrum.

Figure 2A:
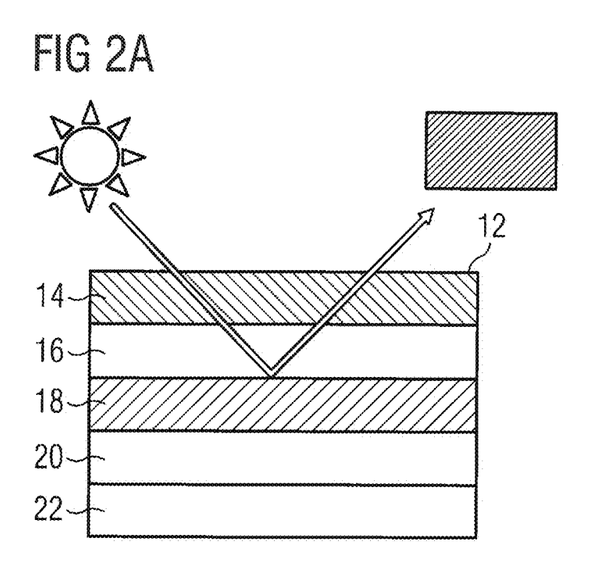
FIG. 2A is a schematic demonstrating the translucent appearance of the second layer of the color changing material of FIG. 1 when the material is unstretched, wherein the unstretched colored appearance is a combination of the coloration of the first layer and the coloration of the third layer.
Figure 2B:
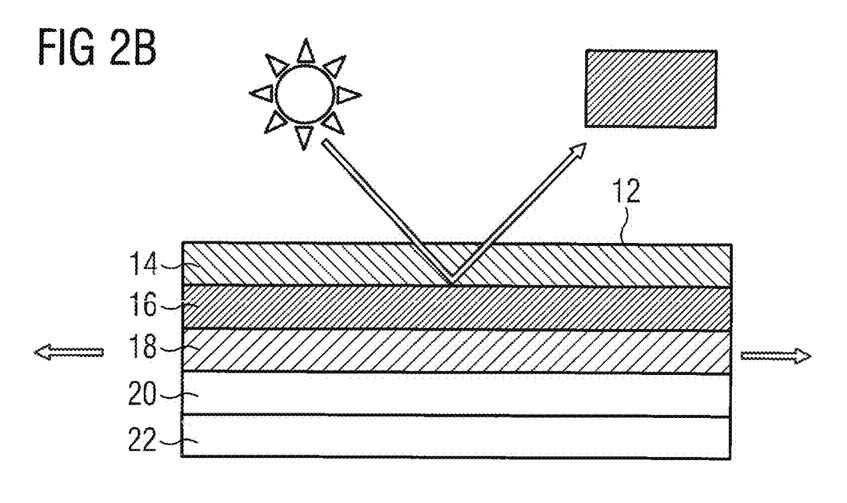
FIG. 2B is a schematic demonstrating the opaque appearance of the second layer of the color changing material of FIG. 1 when the material is stretched, wherein the stretched colored appearance omits the coloration of the third layer.
Figure 3:
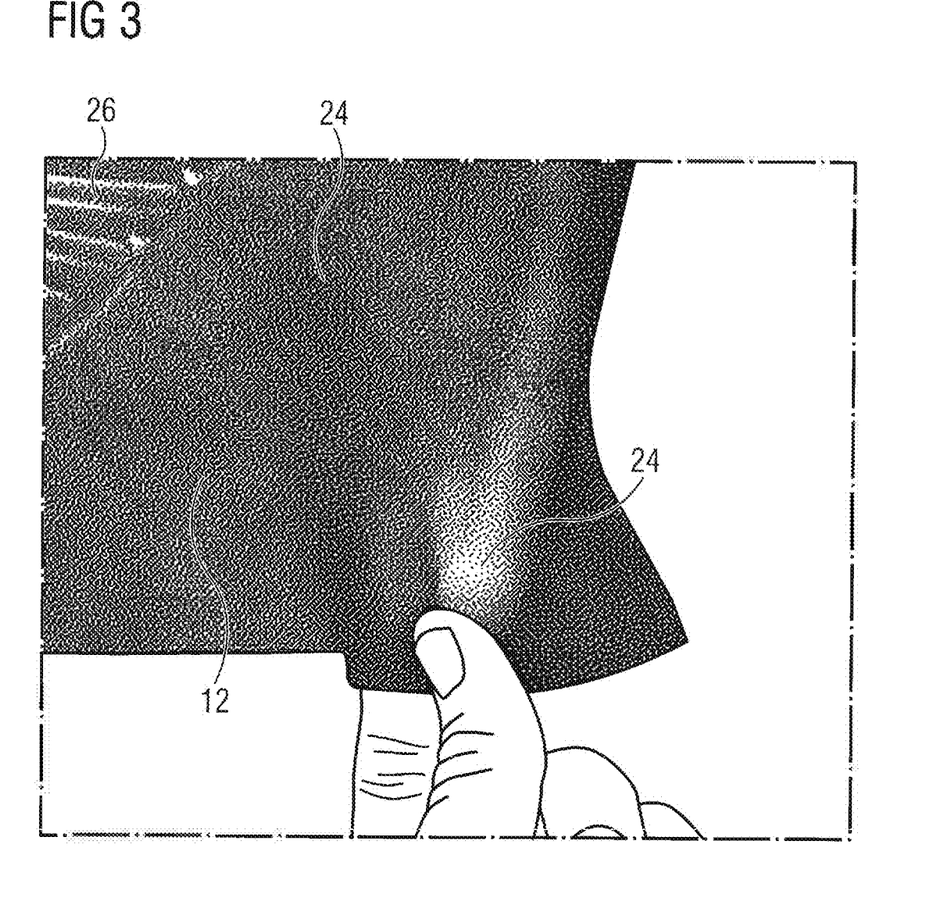
FIG. 3 is an image of the color changing material of FIG. 1 with at least one elastic portion displaying a stretched colored appearance, another elastic portion displaying an unstretched colored appearance, and at least one fixed portion displaying a stretched colored appearance.

In certain embodiments, the second layer 16 also comprises a stretchable material, which may include but is not limited to PU or TPU films. The second layer 16 comprises a substantially translucent appearance that becomes increasingly opaque as increasingly higher magnitudes of stretching forces are applied until the second layer 16 becomes substantially opaque. In other words, the degree of opacity of the second layer 16 is related to the magnitude of stretching force applied to the second layer 16 until second layer 16 reaches a substantially opaque appearance, and this property is best illustrated in FIGS. 2A-2B.

In certain embodiments, the third layer 18 comprises a stretchable material, which may include but is not limited to PU or TPU films, paint, dye, rubber, or other suitable materials. The material that comprises the third layer 18 may include a second coloration, which may be any suitable color including but not limited to any color within the ultraviolet, visible, and infrared light spectrum. In certain cases, it may be desirable to have the third layer 18 include a coloration that is different from the coloration of the first layer 14.

In certain embodiments, the colors of the first layer 14 and the third layer 18 are chosen as complimentary colors which, when combined in the right proportions, produce a desired third color. Examples of such color combinations may be based on subtractive colors, such as the traditional primary/secondary color pairs of red-green, yellow-violet, and blue-orange, or may be based on additive colors, such as the RGB color model where the complementary pairs are red-cyan, green-magenta, and blue-yellow. Other color combinations may include yellow-black, yellow-red, red-blue, metallic, glow in the dark, and reflective combinations.

According to certain embodiments of the present invention, the material 12 comprises an "unstretched condition" and a "stretched condition." The material 12 is in the "unstretched condition" so long as the second layer 16 remains in substantially translucent. The material 12 is in the "stretched condition" when a stretching force of a sufficiently large magnitude is applied to the material 12 so that the second layer 16 is substantially opaque. In certain embodiments, the material 12 may reach the "stretched condition" when the material 12 has been stretched to approximately 10% of its total potential stretchability. However, a person of ordinary skill in the relevant art will understand that the "stretched condition" may be achieved when the material 12 has been stretched to any desirable amount of the total potential stretchability of the material 12.

Figure 1:
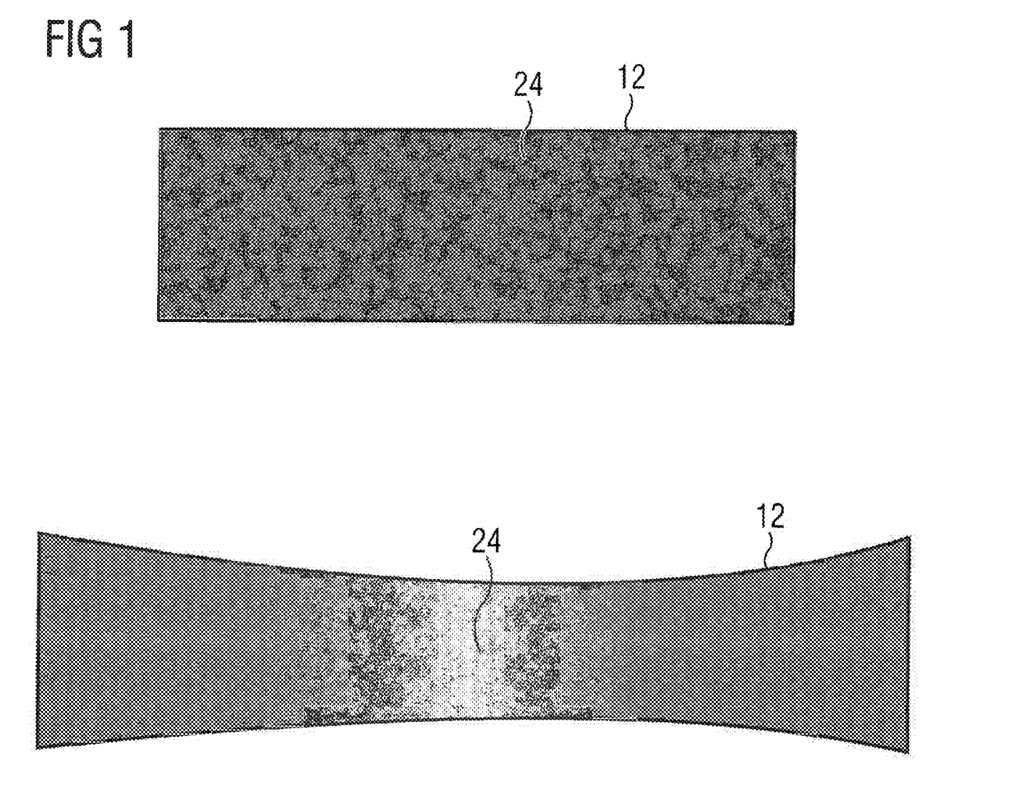
FIG. 1 are illustrations showing an elastic portion of a color changing material displaying an unstretched colored appearance and a stretched colored appearance, respectively, according to certain embodiments of the present invention.

In certain embodiments, the transition between the unstretched condition and the stretched condition of the material 12 results in a change in the colored appearance of the material 12. For example, as illustrated in FIGS. 1 and 2A, the material 12 displays an "unstretched colored appearance" when the material 12 is in the unstretched condition. In contrast, as illustrated in FIGS. 1 and 2B, the material 12 displays a "stretched colored appearance" when the material 12 is in the stretched condition.

For example, as illustrated in FIGS. 1, 3, 4, and 7-11, the first layer 14 may have a yellow coloration, and the third layer 18 may have a black coloration. When the material 12 is in the unstretched condition, the second layer 16 is substantially translucent. As a result, the material 12 has a green appearance because the unstretched colored appearance is a combination of the yellow first layer 14 and the black third layer 18 (which is visible through the substantially translucent second layer 16), as illustrated in FIGS. 1 and 2A.

In contrast, when the material 12 is in the stretched condition, the second layer 16 is substantially opaque. As a result, the material 12 has a yellow appearance because the stretched colored appearance is based on the yellow first layer 14 and the substantially opaque second layer 16 (because the black third layer 18 is substantially concealed by the second layer 16).

A person of ordinary skill in the relevant art will understand that the first layer 14, the second layer 16, and/or the third layer 18 may be coupled to one another via any suitable method including but not limited to laminating, adhering, bonding, silk screening, roller forming, vacuum forming, or any other suitable mechanical, chemical, or heat treatment method.

According to some embodiments, the fourth layer 20 comprises a bonding material that may allow the material 12 to be laminated or otherwise coupled to other materials. The bonding material may include but is not limited to a hot melt material or an adhesive layer.

According to some embodiments, the fifth layer 22 comprises a backing material that may allow the material 12 to be laminated or otherwise coupled to other materials. The backing material 22 may include but is not limited to leather, synthetic leather, PU, TPU, rubber, fabric, nylon, or any other suitable material for the desired application.

In certain embodiments, the total thickness of the material 12 comprises approximately 0.3-0.5 mm, but may range from 0.1 to 1.5 mm. In these embodiments, the third layer 18 comprises approximately 0.1 mm, but may range from 0.05 to 0.3 mm. In some embodiments, the total thickness of the material 12 cannot be too thick or it will become too resistant to stretching. In contrast, the total thickness of the material 12 cannot be too thin or it will become too weak and easily broken, and may appear transparent even when stretched.

In certain embodiments, the material 12 may comprise at least one elastic portion 24. In these embodiments, the elastic portion 24 comprises the unstretched and stretched conditions, as described above. When the elastic portion 24 is in the stretched condition and the stretching force is removed, the elastic portion 24 is configured to return to the unstretched condition due to its elastic properties.

In certain embodiments, the material 12 may further comprise at least one fixed portion 26. In these embodiments, the fixed portion 26 may at least initially comprise the unstretched condition and the stretched condition, as described above. However, the fixed portion 26 may be treated so that when the fixed portion 26 is in the stretched condition and the stretching force is removed, the fixed portion 26 is configured to remain in the stretched condition, also known as a "permanently stretched condition."

Figure 4:
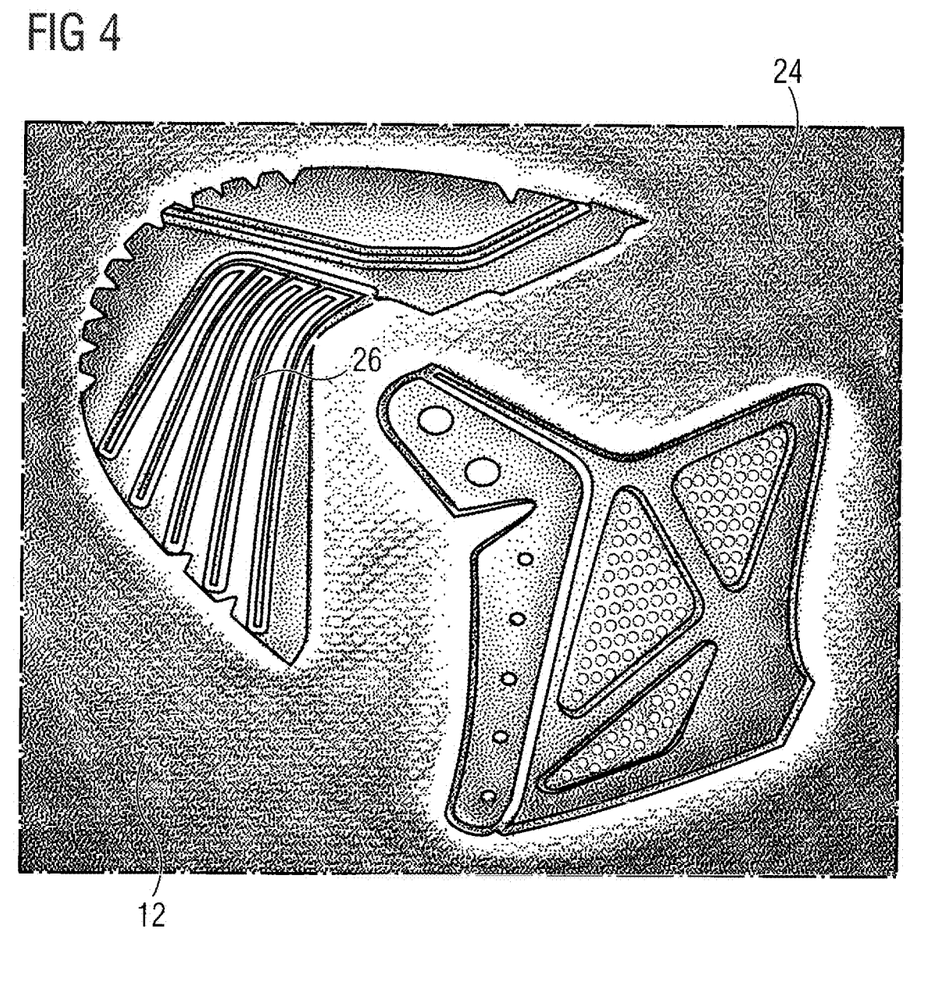
FIG. 4 is another image of the color changing material of FIG. 1 with elastic portions displaying an unstretched colored appearance and fixed portions displaying a stretched colored appearance and shaped to conform to portions of a shoe upper.
Figure 5:
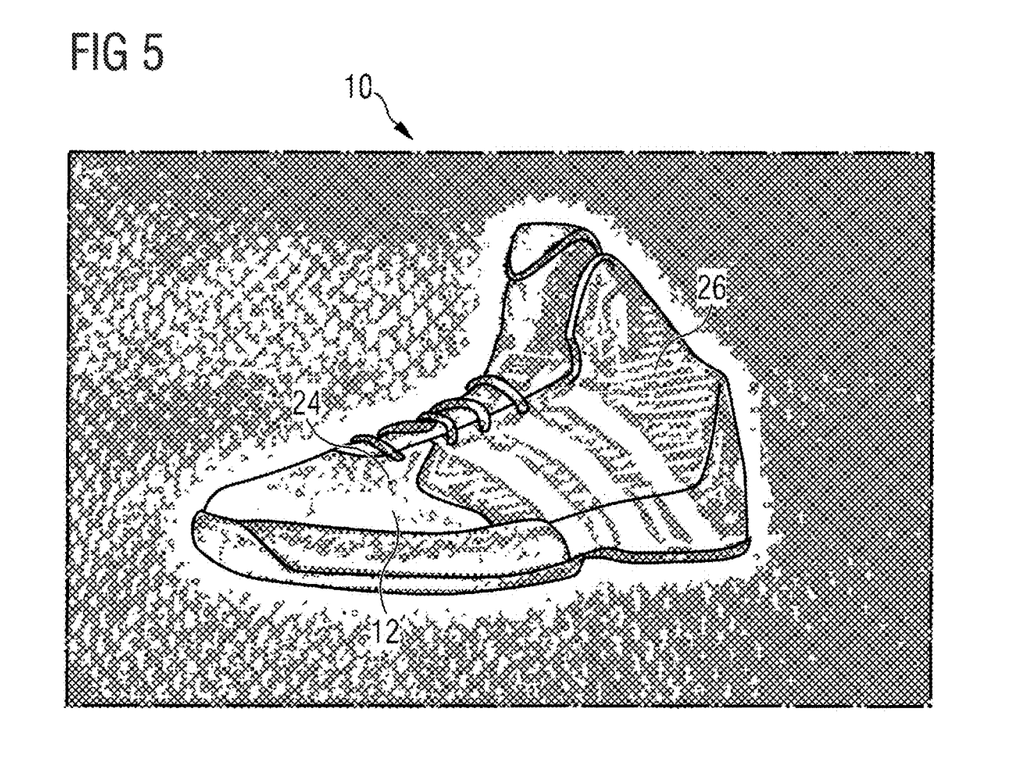
FIG. 5 is an image of a shoe comprising the color changing material of FIG. 1, with elastic portions displaying an unstretched colored appearance and fixed portions displaying a stretched colored appearance and shaped to conform to portions of a shoe upper.
Figure 6:
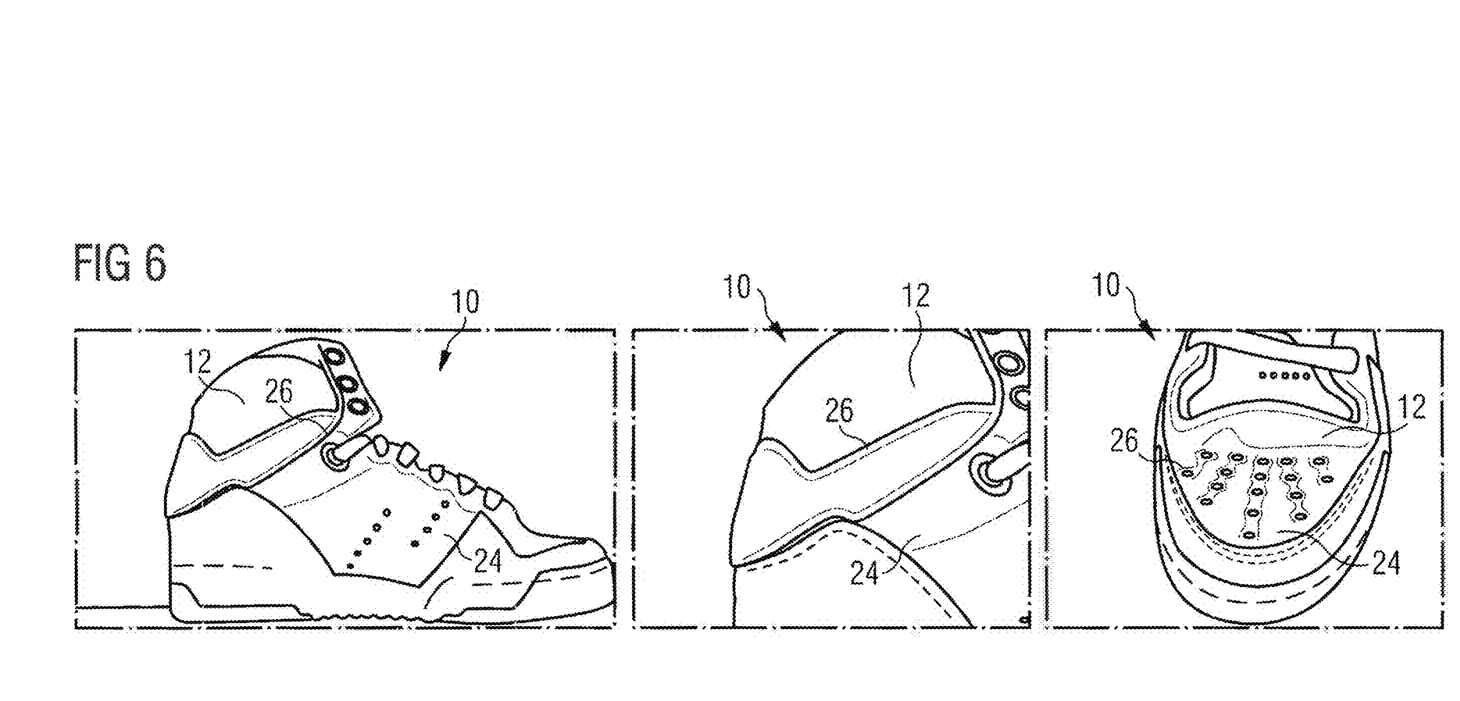
FIG. 6 are additional images of a shoe comprising the color changing material of FIG. 1, with elastic portions displaying an unstretched colored appearance and fixed portions displaying a stretched colored appearance and shaped to conform to portions of a shoe upper.
Figure 7:
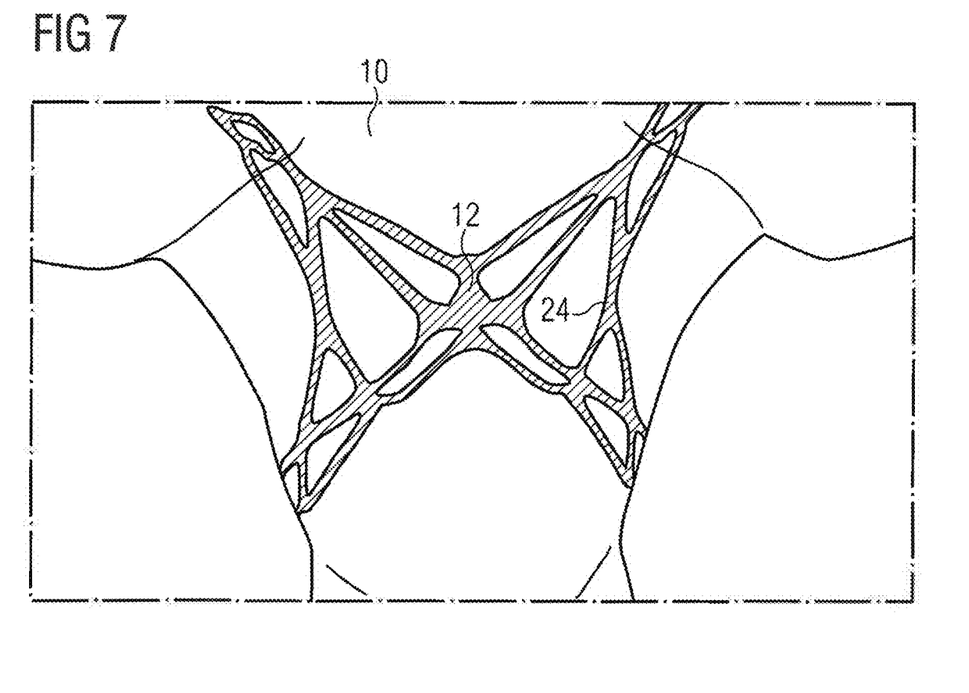
FIG. 7 is an image of an article of wear comprising bands formed from the color changing material of FIG. 1, with elastic portions displaying an unstretched colored appearance.
Figure 8:
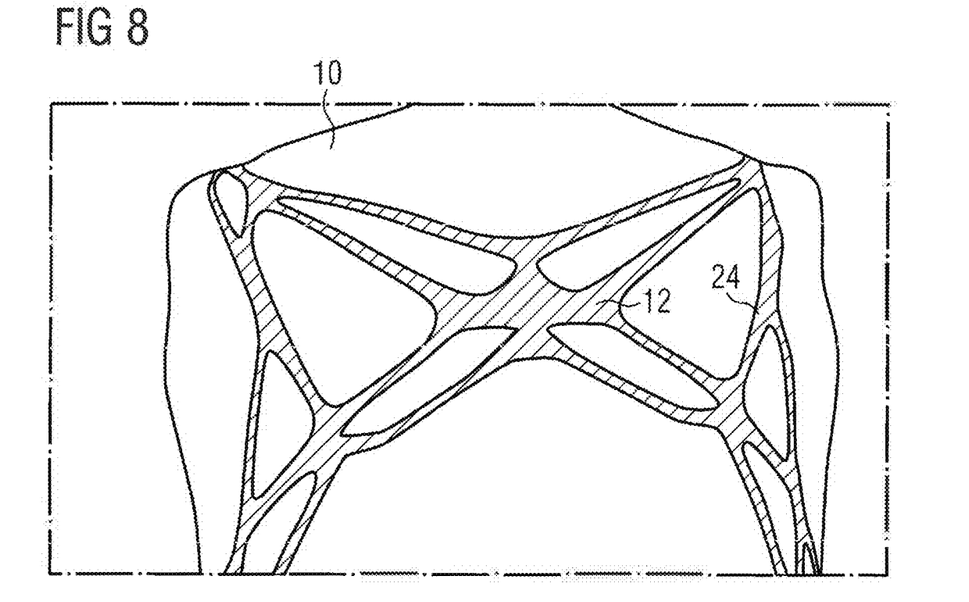
FIG. 8 is an image of the article of wear of FIG. 7, with elastic portions displaying a stretched colored appearance.
Figure 9:
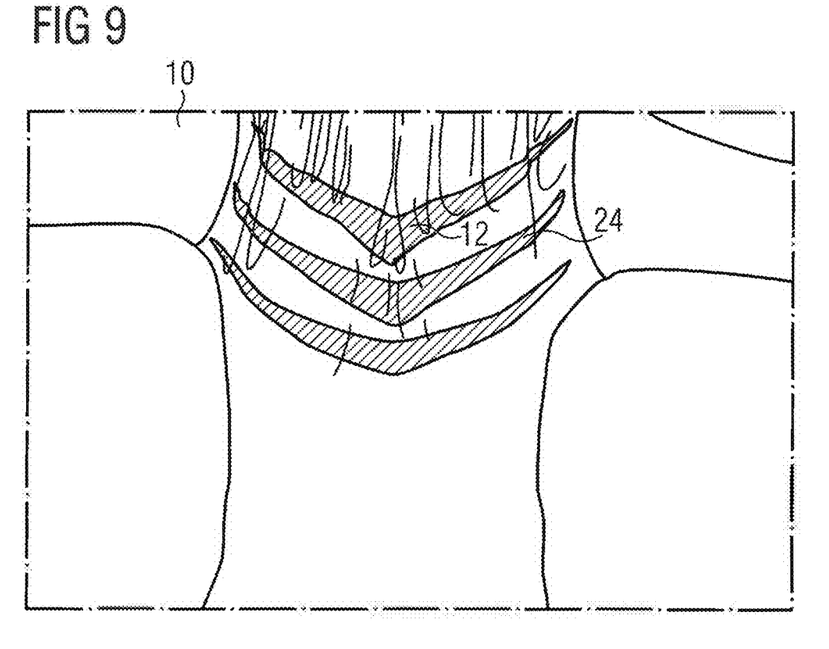
FIG. 9 is an image of an article of wear comprising bands formed from the color changing material of FIG. 1, with elastic portions displaying an unstretched colored appearance.
Figure 10:
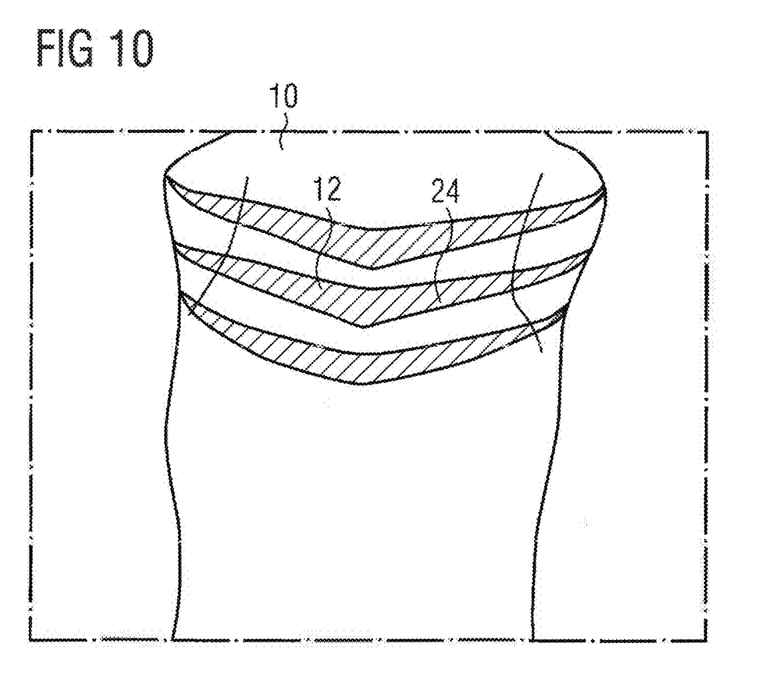
FIG. 10 is an image of the article of wear of FIG. 9, with elastic portions displaying a stretched colored appearance.
Figure 11:
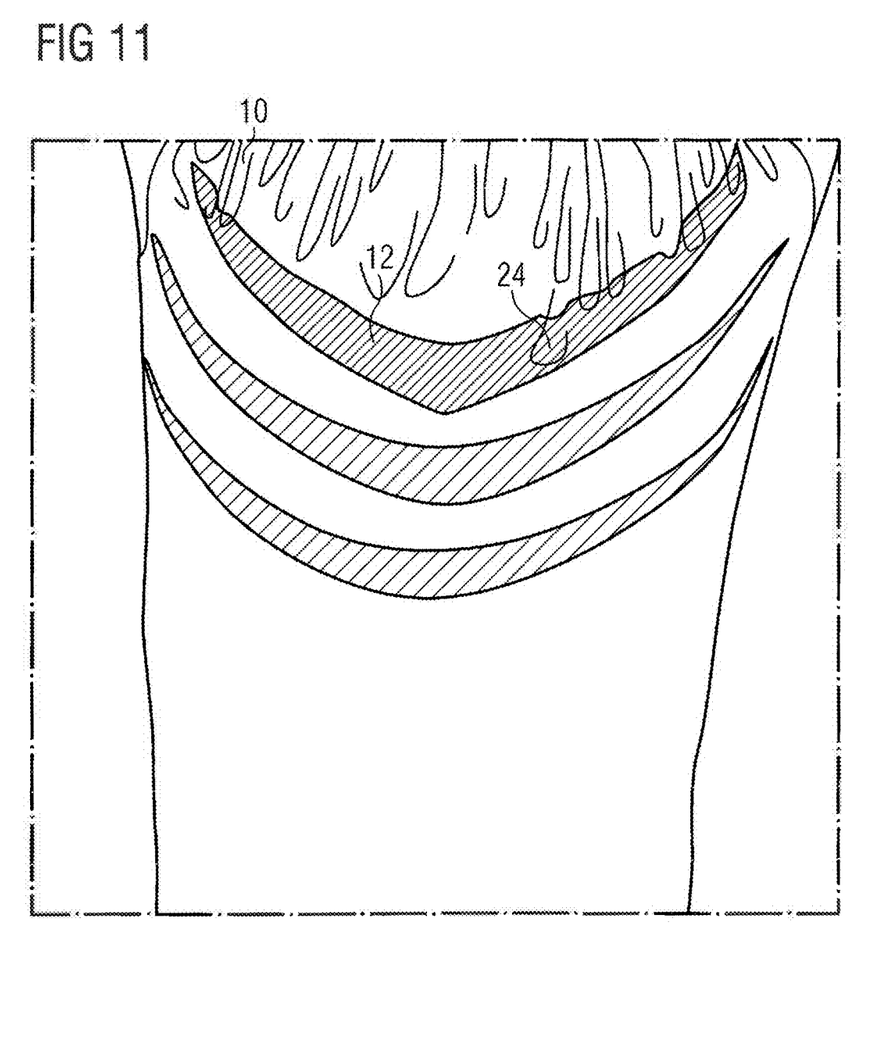
FIG. 11 is an image of the article of wear of FIG. 9, with certain elastic portions displaying an unstretched colored appearance, and other elastic portions displaying a stretched colored appearance.

For example, as illustrated in FIGS. 4-6, the fixed portion 26 is subjected to a molding or vacuum forming process while in the stretched condition. As a result, when the molding or vacuum forming process is complete, the fixed portion 26 has been transformed into the permanently stretched condition so that the fixed portion 26 displays the stretched colored appearance, as described above, regardless of the magnitude of external force applied to the fixed portion 26.

In certain embodiments, the material 12 may be treated with the two-dimensional vacuum forming process and/or the three-dimensional vacuum forming process described in "Methods of Vacuum Forming Articles of Wear," filed by Tiberiu Iovu, U.S. application Ser. No. 14/540,451, filed on Nov. 13, 2014, the disclosure of which is incorporated herein in its entirety by this reference.

In certain embodiments, as best illustrated in FIGS. 4-6, the material 12 may be used in articles of wear 10 so as to include the elastic portion 24 in a toe region where a wearer's toes may press against an interior surface of the article of wear 10 that is too small so as to provide a color changing effect in that location. For example, in these embodiments, the material 12 may be used as an indicator of the degree of stretch being applied in that location so that parents are alerted when a child's toes are cramped in the toe area of the shoe and/or so that any wearer may be aware that they are wearing article of wear 10 that are not properly sized for the wearer's foot. The fixed portion 26 may be included for aesthetic reasons in areas of the article of wear 10 that do not receive a stretching force of a sufficiently large magnitude to transition the material 12 to the stretched condition during normal use. The fixed portion 26 may also be included for aesthetic reasons in areas of the article of wear 10 where an indication of the degree of stretch is not needed or desirable, such as along the sides or back of a shoe upper, as illustrated in FIGS. 4-6.

The material 12 may also provide a color changing effect to sports equipment, shoes, or apparel for a short duration, as illustrated in FIGS. 7-11. The result is a surface treatment that changes to the stretched colored appearance when in the stretched condition and then returns to its unstretched colored appearance once the stretching force is removed.

In certain embodiments, the technology may be included with certain apparel items so that when the material 12 is stretched until it reaches the stretched condition, it changes color to the stretched colored appearance and then reverts back to the unstretched colored appearance once the stretching force is removed. This design provides a very dynamic effect and may be tuned to provide an indication of how far the garment was stretched (i.e., the color change from the unstretched colored appearance to the stretched colored appearance is gradual so that the degree of color change may be correlated to the degree of force applied to the garment).

When used in conjunction with a material 12 with known elastic properties, one may use a color coding chart to adjust the amount of pressure (or tension) applied to a certain body segment (e.g., when applying medical stretch tape (used in rehabilitation and injury prevention)) so that it does not exceed a predetermined safe pressure limit.

This visual indicator may also be used to indicate how well a garment fits. Because of the dynamic nature of the material 12, an athlete may be filmed in motion while wearing the apparel and studied to see how much color change is visible in the material 12 during dynamic motions. The amount of color change may indicate that a garment is too restrictive or too loose in certain areas and this information may then be used to custom tailor an article.

In certain embodiments, the material 12 is used with articles of wear 10 to give fans a better indication of how fast an athlete is moving. For example, soccer players are beginning to wear jerseys with stretch membranes during games. Membranes incorporating the material 12 may give spectators and coaches a visual indication if a player is just lightly jogging (where there might be minimal color change) or if the player is in an all-out sprint for the ball (where the color change could be very dramatic based on the greater extension of the limbs).

In certain electronic training programs, colored zones are currently used to describe effort. For example, as illustrated in U.S. Pat. No. 8,200,323, FIG. 8, at a slow jog, a runner's heart rate or pace is described as being in the blue zone, a stronger effort in the green zone up to the aerobic threshold, then the yellow zone in the anaerobic zone, and lastly red, which represents maximum effort. In certain embodiments, apparel, footwear, and accessory products (i.e., articles of wear 10) may incorporate the material 12 to mimic this color change scheme so that as a runner is increasing effort, some or all of the articles of wear 10 change color to mimic the color zones and also to indicate to other runners the rapidity of their pace.

As described above, the fixed portions 26 of the material 12 may be provided in other locations of any of the above articles of wear 10 so as to provide an aesthetically pleasing look in areas where an indicator of the degree of stretch is not relevant or desirable.

In the following, further examples are described to facilitate the understanding of the invention:

1. An article of wear comprising
    a material with color changing properties comprising:
        a first layer;
        a third layer positioned below the first layer; and
        a second layer positioned between the first layer and the third layer, wherein the second layer comprises a substantially translucent appearance in an unstretched condition, and a substantially opaque appearance in a stretched condition;
    at least one elastic portion of the material comprising an unstretched colored appearance when the second layer is in the unstretched condition and a stretched colored appearance when the second layer is in the stretched condition, wherein the unstretched colored appearance is different from the stretched colored appearance; and
    at least one fixed portion of the material comprising a permanently stretched condition, wherein the at least one fixed portion comprises the stretched colored appearance regardless of a magnitude of an external force applied to the at least one fixed portion.
2. The article of wear of example 1, wherein the first layer comprises a first coloration, and the third layer comprises a second coloration that is different from the first coloration,
    wherein the unstretched colored appearance comprises a combination of the first coloration and the second coloration, and
    wherein the second coloration is concealed from the stretched colored appearance by the second layer.
3. The article of wear of example 2, wherein the first coloration is complementary to the second coloration.
4. The article of wear of any preceding example, wherein the second layer is polyurethane or thermoplastic polyurethane film.
5. The article of wear of any preceding example, wherein the at least one fixed portion is located on a shoe upper.
6. The article of wear of any preceding example, wherein the at least one elastic portion is located over a toe region of a shoe upper.
7. The article of wear of example 6, wherein the at least one elastic portion is an indicator of when a shoe comprising the shoe upper is not properly sized for a wearer's foot.
8. The article of wear of example 7, wherein the at least one fixed portion is located in an area of the shoe upper where an indicator of the magnitude of the external force being applied to the at least one fixed portion in that location is not needed.

9. An article of wear comprising:
   a material with color changing properties comprising:
      at least one elastic portion comprising an unstretched colored appearance and a stretched colored appearance;
      at least one fixed portion comprising the stretched colored appearance regardless of a magnitude of an external force applied to the at least one fixed portion;
   wherein the at least one elastic portion is positioned within the article of wear in a location where the at least one elastic portion is an indicator of a magnitude of an external force being applied to the at least one elastic portion in that location; and
   wherein the at least one fixed portion is positioned within the article of wear in a location where an indicator of the magnitude of the external force being applied to the at least one fixed portion in that location is not needed.

10. The article of wear of example 9, wherein the unstretched colored appearance is different from the stretched colored appearance.

11. The article of wear of example 9 or 10, wherein the at least one fixed portion is located on a shoe upper.

12. The article of wear of any of examples 9-11, wherein the at least one elastic portion is located over a toe region of a shoe upper.

13. The article of wear of any of examples 9-12, wherein the at least one elastic portion is an indicator of when a shoe comprising the shoe upper is not properly sized for a wearer's foot.

14. An article of wear comprising:
   a material with color changing properties comprising:
      a first layer having a first coloration;
      a third layer having a second coloration and positioned below the first layer; and
      a second layer positioned between the first layer and the third layer;
   at least one elastic portion of the material comprising
      an unstretched colored appearance comprising a combination of the first coloration and the second coloration; and
      a stretched colored appearance that does not include the second coloration;
   wherein the at least one elastic portion is positioned within the article of wear in a location where the at least one elastic portion is an indicator of a magnitude of an external force being applied to the at least one elastic portion in that location; and
   at least one fixed portion comprising the stretched colored appearance regardless of a magnitude of an external force applied to the at least one fixed portion;
      wherein the at least one fixed portion is positioned within the article of wear in a location where an indicator of the magnitude of the external force being applied to the at least one fixed portion in that location is not needed.

15. The article of wear of example 14, wherein the first coloration is different from the second coloration.

16. The article of wear of example 14 or 15, wherein the first coloration is complementary to the second coloration.

17. The article of wear of any of examples 14-16, wherein the second layer is polyurethane or thermoplastic polyurethane film.

18. The article of wear of any of examples 14-17, wherein the at least one fixed portion is located on a shoe upper.

19. The article of wear of any of examples 14-18, wherein the at least one elastic portion is located over a toe region of a shoe upper.

20. The article of wear of any of examples 14-19, wherein the at least one elastic portion is an indicator of when a shoe comprising the shoe upper is not properly sized for a wearer's foot.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A component of an article of footwear, the component comprising:
   a material with color changing properties comprising:
      at least one elastic portion comprising an unstretched colored appearance and a stretched colored appearance; and
      at least one fixed portion comprising the stretched colored appearance regardless of a magnitude of an external force applied to the at least one fixed portion, wherein the at least one elastic portion is positioned within the component of the article of footwear in a location where the at least one elastic portion is an indicator of a magnitude of an external force being applied to the at least one elastic portion in that location; the material comprises a first layer, a second layer, and a third layer that each extend across an entire surface of the component of the article of footwear such that the first layer is an outermost layer of the component of the article of footwear; and
   the external force being applied to the at least one elastic portion causes a change from the unstretched colored appearance to the stretched colored appearance at a location of the at least one elastic portion where stretching occurs.

2. The component of the article of footwear of claim 1, wherein the unstretched colored appearance is different from the stretched colored appearance.

3. The component of the article of footwear of claim 1, wherein the at least one fixed portion is located on a shoe upper.

4. The component of the article of footwear of claim 1, wherein the at least one elastic portion is located over a toe region of a shoe upper.

5. The component of the article of footwear of claim 4, wherein the at least one elastic portion is an indicator of when a shoe comprising the shoe upper is not properly sized for a wearer's foot.

6. The component of the article of footwear of claim 1, wherein the external force being applied to the at least one elastic portion causes stretching in a plurality of nonparallel directions and a change from the unstretched colored appearance to the stretched colored appearance.

7. A component of an article of footwear, the component comprising:
- a material with color changing properties comprising:
  - a first layer having a first coloration;
  - a third layer having a second coloration and positioned below the first layer; and
  - a second layer positioned between the first layer and the third layer;
- at least one elastic portion of the material comprising an unstretched colored appearance comprising a combination of the first coloration and the second coloration; and a stretched colored appearance that does not include the second coloration; wherein the at least one elastic portion is positioned within the component of the article of footwear in a location where the at least one elastic portion is an indicator of a magnitude of an external force being applied to the at least one elastic portion in that location; and
- at least one fixed portion comprising the stretched colored appearance regardless of a magnitude of an external force applied to the at least one fixed portion; wherein the first, second, and third layers extend across an entire surface of the component of the article of footwear such that the first layer is an outermost layer of the component of the article of footwear; and wherein a change from the unstretched colored appearance to the stretched colored appearance occurs locally at a location of stretching of the at least one elastic portion.

8. The component of the article of footwear of claim 7, wherein the first coloration is different from the second coloration.

9. The component of the article of footwear of claim 7, wherein the first coloration is complementary to the second coloration.

10. The component of the article of footwear of claim 7, wherein the second layer is polyurethane or thermoplastic polyurethane film.

11. The component of the article of footwear of claim 7, wherein the at least one fixed portion is located on a shoe upper.

12. The component of the article of footwear of claim 7, wherein the at least one elastic portion is located over a toe region of a shoe upper.

13. The component of the article of footwear of claim 12, wherein the at least one elastic portion is an indicator of when a shoe comprising the shoe upper is not properly sized for a wearer's foot.

14. The component of the article of footwear of claim 7, wherein the external force being applied to the at least one elastic portion causes stretching in a plurality of nonparallel directions and a change from the unstretched colored appearance to the stretched colored appearance.

* * * * *